US008601144B1

(12) United States Patent
Ryner

(10) Patent No.: US 8,601,144 B1
(45) Date of Patent: Dec. 3, 2013

(54) SYSTEMS AND METHODS FOR AUTOMATIC ICE RELAY CANDIDATE CREATION

(71) Applicant: Sansay, Inc., San Diego, CA (US)

(72) Inventor: Gerald T. Ryner, San Diego, CA (US)

(73) Assignee: Sansay, Inc., San Diego, CA (US)

( * ) Notice: Subject to any disclaimer, the term of this patent is extended or adjusted under 35 U.S.C. 154(b) by 0 days.

(21) Appl. No.: 13/827,793

(22) Filed: Mar. 14, 2013

Related U.S. Application Data

(60) Provisional application No. 61/730,345, filed on Nov. 27, 2012.

(51) Int. Cl.
*G06F 15/16* (2006.01)

(52) U.S. Cl.
USPC .......................................... 709/228; 709/230

(58) Field of Classification Search
USPC .................. 709/228, 230; 370/395.5, 412
See application file for complete search history.

(56) References Cited

U.S. PATENT DOCUMENTS

| | | | |
|---|---|---|---|
| 7,983,254 B2 | 7/2011 | Alt et al. | |
| 8,054,827 B2 | 11/2011 | Riley et al. | |
| 8,204,064 B2 | 6/2012 | MeLampy et al. | |
| 8,218,458 B2 | 7/2012 | Flynn et al. | |
| 8,233,484 B2 | 7/2012 | Hiribarren et al. | |
| 8,249,076 B1 | 8/2012 | Bertone et al. | |
| 8,312,169 B2 | 11/2012 | Perumal et al. | |
| 8,325,741 B2 | 12/2012 | Zhu | |
| 2002/0120749 A1* | 8/2002 | Widegren et al. | 709/227 |
| 2002/0184510 A1* | 12/2002 | Shieh | 713/185 |
| 2003/0120135 A1* | 6/2003 | Gopinathan et al. | 600/300 |
| 2006/0015463 A1* | 1/2006 | Gupta et al. | 705/52 |
| 2008/0259943 A1* | 10/2008 | Miyajima et al. | 370/401 |
| 2009/0006633 A1* | 1/2009 | Moore et al. | 709/228 |
| 2009/0135842 A1* | 5/2009 | Zhu | 370/401 |
| 2009/0245233 A1* | 10/2009 | Prasad et al. | 370/352 |
| 2009/0274146 A1* | 11/2009 | Zhu | 370/352 |
| 2010/0131621 A1 | 5/2010 | Zetterlund et al. | |
| 2010/0217874 A1* | 8/2010 | Anantharaman et al. | 709/228 |
| 2010/0293297 A1* | 11/2010 | Perumal et al. | 709/245 |
| 2010/0312880 A1* | 12/2010 | Veits | 709/224 |
| 2011/0060835 A1* | 3/2011 | Dorso et al. | 709/227 |
| 2011/0122885 A1* | 5/2011 | Hedman et al. | 370/412 |
| 2011/0191493 A1* | 8/2011 | Lee et al. | 709/238 |
| 2011/0289221 A1* | 11/2011 | Lowekamp | 709/227 |
| 2012/0065813 A1* | 3/2012 | Nguyen et al. | 701/2 |
| 2012/0142341 A1 | 6/2012 | Nagpal et al. | |
| 2012/0158974 A1 | 6/2012 | Perumal et al. | |
| 2012/0300242 A1* | 11/2012 | Meike et al. | 358/1.13 |
| 2013/0089187 A1* | 4/2013 | Stahl | 379/32.01 |
| 2013/0163446 A1* | 6/2013 | Kruger et al. | 370/252 |
| 2013/0185440 A1* | 7/2013 | Blau et al. | 709/227 |

* cited by examiner

*Primary Examiner* — Kostas Katsikis
(74) *Attorney, Agent, or Firm* — Proskauer Rose LLP

(57) ABSTRACT

Methods and apparatuses, including computer program products, are described for automatically creating ICE relay candidates without the use of the TURN protocol. The system introduces a media server device called a WebSBC server, available from Sansay, Inc. of San Diego, Calif. The WebSBC server is a device that exists in the network and receives control messages from another device in the network for the purpose of allocating a media relay port to be used by ICE clients in the network. The method includes the action of adding the allocated relay port to a media relay binding description (SDP) in the form of an ICE relay candidate. The method includes the passing of the modified SDP to an ICE client that is in the process of creating an audio or video session with another ICE client.

28 Claims, 6 Drawing Sheets

SYSTEMS AND METHODS FOR AUTOMATIC ICE RELAY CANDIDATE CREATION

RELATED APPLICATIONS

This application claims priority to U.S. Provisional Patent Application No. 61/730,345, filed on Nov. 27, 2012, the contents of which are incorporated herein in their entirety.

TECHNICAL FIELD

This application relates generally to methods and apparatuses, including computer program products, for automatically creating Interactive Connectivity Establishment (ICE) relay candidates without using Traversal Using Relays around NAT (TURN).

BACKGROUND

An Internet Protocol (IP) session involves the connection between two devices across a network of routers, cables, and switches for the purpose of exchanging packets of information. For example, a web browser can establish an IP-based HTTPS session with a website for the purpose of retrieving information. In another example, a device can establish a Session Initiation Protocol (SIP) session with another computing device to, e.g., conduct a phone call.

Web browsers have recently begun adopting the Web Real-Time Communication (WebRTC) protocol for the purpose of establishing real-time audio and video sessions between browser clients. The WebRTC protocol as defined by the IETF relies on the ICE (RFC 5245) methods for establishing a direct communication link between the two clients. Under certain network topologies, the only means for a successful communication link is through the use of a media relay server placed out in the network.

For both SIP and WebRTC sessions, ICE defines that media relay server to be a Traversal Using Relays around NAT (TURN) server running the TURN protocol (RFC 5766). The TURN protocol however is susceptible to many types of attacks such as theft of service and distributed denial of service.

The ICE protocol is designed to allow two client devices to automatically discover the best way to send voice and video media streams across an IP network. Certain network topologies such as those using Firewall/NATs can prevent the devices from directly communicating due to the way in which some Firewall/NATs create and enforce IP address and port access. The NAT function automatically maps an external IP address and port to every outbound message stream the client produces. The procedures of ICE allow the client to learn what IP address and port the NAT has assigned. When a client decides to initiate a real-time session, the client must first determine which IP address and port combinations are available for the purpose of establishing a media connection with another client. These IP and port combinations are called "candidates" in the terminology of ICE.

In the simplest model, a client begins its candidate discovery by sending a STUN (RFC 5389) binding request to a STUN server somewhere out in the network. The STUN server responds to the client binding request and provides the IP address and port information of where the STUN server saw the binding request originate from. If the client is behind a Firewall/NAT, the STUN server sees the external IP address and port that the NAT assigned to this outbound message transmission. This is called the Server Reflexive candidate.

According to ICE, a client in need of a network media relay issues a TURN allocation request using a procedure similar to STUN. In addition to providing the Server Reflexive candidate, the TURN request asks the TURN server to allocate a media relay port for the client to use. FIG. 1 depicts a system for establishing a media connection using a TURN service. The system 100 includes a website application server 102 that is connected to a plurality of client computing devices (e.g., Client A 108, Client B 110) via Firewall/NAT devices 106*a*, 106*b* respectively. The system also includes a TURN server 104 that is also connected to the client devices 108, 110 via the Firewall/NAT devices 106*a*, 106*b*.

The website application server 102 hands the TURN service credentials to Client A 108 when Client A initiates a call request (e.g., a SIP INVITE, a WebRTC call request) by clicking on a web page link, for example. Client A 108 then issues the necessary resource allocation messages to the TURN server 104 using the TURN protocol. The allocation response from the TURN server 104 contains the ICE Relay candidate, referred to as (r1) in FIG. 1, to Client A 108. Note that the port (t1) is the TURN service port and not the Relay candidate.

In the TURN model, the client device then creates a Session Description Protocol (SDP) of its possible media candidates. In FIG. 1, Client A 108 creates an SDP containing the Host candidate (a1), the Server Reflexive candidate (a2), and the Relay candidate (r1). The SDP is then passed up to the website application server 102 using the mechanisms of the media protocol (e.g., WebRTC, SIP). The website application server 102 then uses the media protocol to send the SDP of Client A 108 down to Client B 110. Client B 110 then initiates its own candidate discovery using STUN. Client B 110 does not attempt a TURN reservation because client B sees that Client A 108 has already offered a Relay candidate and only one relay candidate is needed per media stream.

After the STUN binding exchange, Client B 110 creates its SDP using the Host candidate (b1) and the Server Reflexive candidate (b2). The SDP is handed up to the website application server 102 using the media protocol and the website application server 102 delivers the SDP to Client A 108. Both Client A 108 and Client B 110 now have the other client's SDP and the STUN connectivity checks begin. ICE defines the priority of the various permutations that arise when each client systematically tries to communicate between candidates. Client A 108, for instance, attempts to send a STUN message from its Host candidate to Client B's (110) Host candidate (a1-b1). If Client A 108 does not see a response, then Client A tries to send a STUN connectivity message to the Server Reflexive candidate of Client B 110 and make the attempt occur between (a2-b2), as shown in FIG. 1.

At the same time, Client B 110 performs STUN connectivity checks towards Client A's (108) candidates. If the Host and Reflexive candidates do not succeed, then Client B 110 sends a STUN connectivity check to the Relay candidate (r1). The TURN server 104 then encapsulates the request inside a TURN header and forwards the encapsulated request to Client A 108 using the established TURN binding (a2-t1). Because Client A 108 created that TURN binding, Client A receives the encapsulated STUN connectivity message and responds using the reverse path (a2-t1-r1-b2). Client B 110 then successfully receives the connectivity response and both clients 108, 110 decide to use that connection for the media stream. This entire process must happen for each media stream. For example, a call using audio and video will have to perform the above process twice before exchanging audio and video data.

The TURN server 104 shown in FIG. 1 is susceptible to attack due to a few of its basic design characteristics.

1) The client (e.g., Client B 110) is given the authentication credentials needed by the TURN server 104 in order to "securely" make the Relay candidate reservation. A compromised client can easily learn the credentials and can use them for other purposes such as using the TURN server for a completely different website, thus stealing service from the original website.
2) The TURN server 104 is forced to accept reservation requests from anywhere in the network and must attempt to verify the sender's legitimacy by performing a computation on the provided credentials. This can create a denial of service condition if the TURN server gets flooded with these requests.
3) The TURN server 104 must use the same port interface for its TURN reservations and the resulting media flows. The media must flow over the same binding that created the relay reservation in order to successfully traverse the Firewall/NAT (e.g., Firewall/NAT 106a, 106b). That is why the TURN protocol requires the media flows to be encapsulated inside a TURN packet so that the TURN server 104 can distinguish the difference between the control and media packets.

SUMMARY

The systems and methods described herein allow for a session border controller (SBC) or a Web Session Border Controller (WebSBC™) server to be used in place of a TURN server such that the media relay function is not subject to the service-affecting attacks of TURN. The WebSBC server, available from Sansay, Inc. of San Diego, Calif., differs from a TURN server fundamentally by only allowing resource allocations to occur directly from the website application server. In contrast, ICE deployments that rely on TURN servers initiate resource allocations directly from the client which result in the inherent security problems.

The WebSBC server, with its direct interface to the website application server, allows for secure media relay allocations to occur outside of the client's direct involvement or knowledge. The WebSBC server allocation information is provided to the website application server application for the purpose of manipulating the media relay binding description, also called the Session Description Protocol (SDP) (see RFC 4566) by adding the allocated relay candidate to the client-provided SDP. The SDP that is exchanged between the clients, through the website application server, therefore offers a pre-allocated media relay candidate that the clients naturally use according to the procedures of ICE. The WebSBC server performs the media relay function securely and effectively, without using the TURN protocol.

The invention, in one aspect, features a method for securely allocating media relay candidates without using TURN. A website application server receives a media relay binding description from a first client device, the binding description including relay candidates associated with the first client device. The website application server determines a subscription profile associated with the first client device and creates an allocation link to a session border controller based on the subscription profile. The website application server modifies the media relay binding description to include one or more relay ports located on the session border controller, and transmits the media relay binding description to a second client device. The website application server receives one or more relay candidates associated with the second client device, and transmits to the first client device, the media relay binding description including the one or more relay candidates associated with the second client device. A media relay connection is established between the first client device and the second client device based on the media relay binding description, the connection established via the relay ports located on the session border controller.

The invention, in another aspect, features a system for securely allocating media relay candidates without using TURN. The system includes a website application server configured to receive a media relay binding description from a first client device, the binding description including relay candidates associated with the first client device. The website application server is further configured to determine a subscription profile associated with the first client device and create an allocation link to a session border controller based on the subscription profile. The website application server is further configured to modify the media relay binding description to include one or more relay ports located on the session border controller, and transmit the media relay binding description to a second client device. The website application server is further configured to receive one or more relay candidates associated with the second client device, and transmit, to the first client device, the media relay binding description including the one or more relay candidates associated with the second client device. A media relay connection is established between the first client device and the second client device based on the media relay binding description, the connection established via the relay ports located on the session border controller.

The invention, in another aspect, features a computer program product, tangibly embodied in a non-transitory computer readable medium, for securely allocating media relay candidates without using TURN. The computer program product includes instructions operable to cause a data processing apparatus to receive a media relay binding description from a first client device, the binding description including relay candidates associated with the first client device. The computer program product includes instructions operable to cause the data processing apparatus to determine a subscription profile associated with the first client device and create an allocation link to a session border controller based on the subscription profile. The computer program product includes instructions operable to cause the data processing apparatus to modify the media relay binding description to include one or more relay ports located on the session border controller, and transmit the media relay binding description to a second client device. The computer program product includes instructions operable to cause the data processing apparatus to receive one or more relay candidates associated with the second client device, and transmit, to the first client device, the media relay binding description including the one or more relay candidates associated with the second client device. A media relay connection is established between the first client device and the second client device based on the media relay binding description, the connection established via the relay ports located on the session border controller.

Any of the above aspects can include one or more of the following features. In some embodiments, the relay candidates associated with the first client device and the relay candidates associated with the second client device are Interactive Connectivity Establishment (ICE) candidates. In some embodiments, the allocation link is created using a secure protocol. In some embodiments, the secure protocol is Representational State Transfer (REST) over Hypertext Transfer Protocol Secure (HTTPS). In some embodiments, the media relay connection uses the Web Real-Time Communication (WebRTC) protocol and the session border controller is a WebSBC server. In some embodiments, the media relay connection uses Session Initiation Protocol (SIP) and the session border controller is a SIP session border controller.

In some embodiments, establishing a media relay connection includes the session border controller receiving a connectivity message from the first client device via a first one of the relay ports located on the session border controller, and receiving a connectivity message from the second client device via a second one of the relay ports located on the session border controller. The session border controller authenticates the connectivity messages using credential information received from the website application server via the allocation link, and latches address information associated with the first client device to the first one of the relay ports. The session border controller latches address information associated with the second client device to the second one of the relay ports. The session border controller forwards the connectivity message from the first client device to the second client device, and forwards the connectivity message from the second client device to the first client device.

In some embodiments, the connectivity messages are based on the Session Traversal Utilities for NAT (STUN) protocol. In some embodiments, the connectivity message from the first client device includes the address information associated with the first client device and the connectivity message from the second client device includes the address information associated with the second client device. In some embodiments, the address information associated with the first client device represents a new IP address and port number generated by the first client device upon transmitting the connectivity message to the session border controller. In some embodiments, the address information associated with the second client device represents a new IP address and port number generated by the second client device upon transmitting the connectivity message to the session border controller.

In some embodiments, the media relay binding description is a Session Description Protocol (SDP) message. In some embodiments, the relay candidates associated with the first client device include a server reflexive address associated with a Network Address Translation (NAT) device coupled between the first client device and the website application server. In some embodiments, the relay candidates associated with the second client device include a server reflexive address associated with a Network Address Translation (NAT) device coupled between the second client device and the website application server.

Other aspects and advantages of the technology will become apparent from the following detailed description, taken in conjunction with the accompanying drawings, illustrating the principles of the technology by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

DETAILED DESCRIPTION

Figure 1:
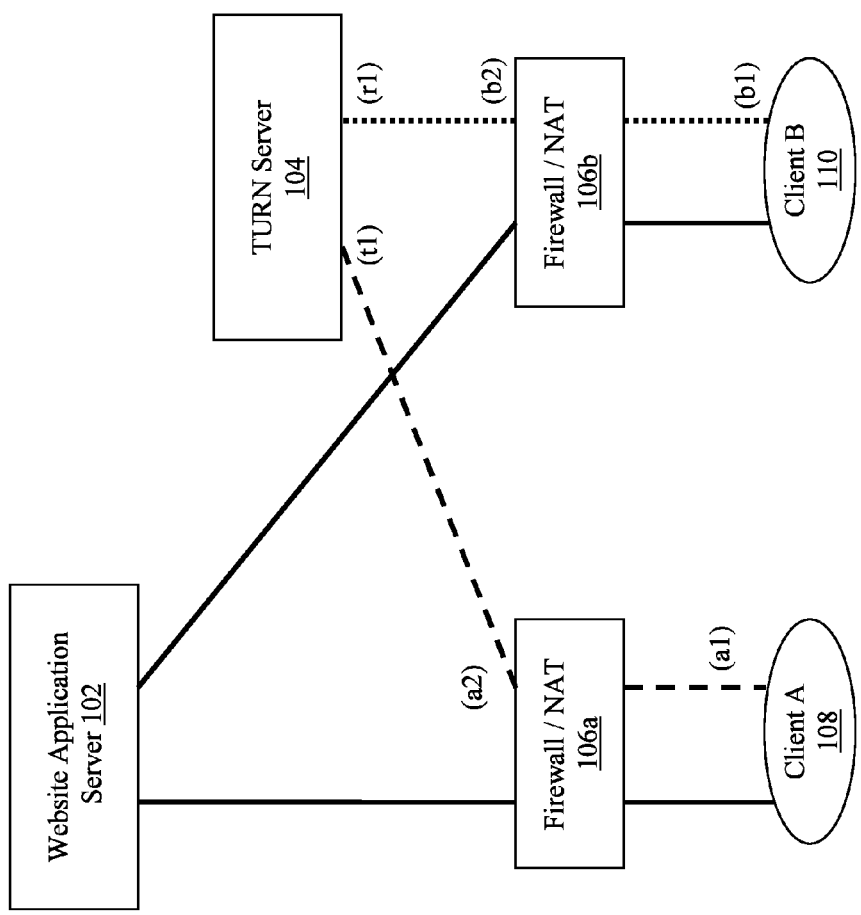
FIG. 1 is a block diagram of a system using a TURN model with media allocations performed by the ICE clients, as illustrated in the art.
Figure 2:
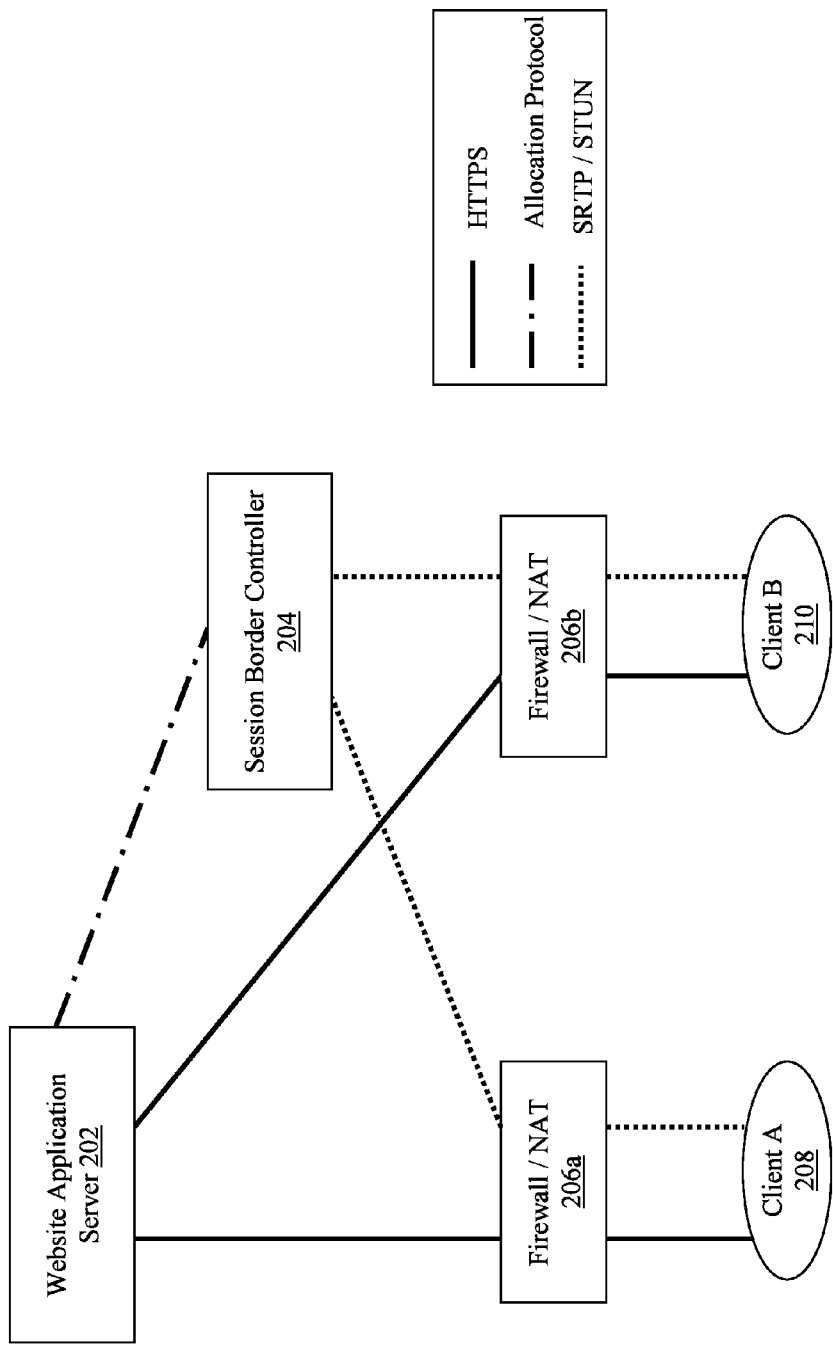
FIG. 2 is a block diagram of a system for securely allocating media relay candidates without using Traversal Using Relays around NAT (TURN).

The systems and methods described herein do not require a TURN server or TURN protocol to be run by the clients. FIG. 2 is a block diagram of a system for securely allocating media relay candidates without using Traversal Using Relays around NAT (TURN). By using the system 200, a successful media relay can be allocated much more securely and with less complexity. Also, the clients do not need any modification from the standard ICE procedures. The system 200 only utilizes the STUN capabilities of the ICE clients.

The system 200 includes a website application server 202 that is connected to a plurality of client computing devices (e.g., Client A 208, Client B 210) via Firewall/NAT devices 206a, 206b respectively. Example client devices can include, but are not limited to, personal computers, tablets, mobile computing devices, smart phones, and the like. The system also includes a WebSBC server 204 that is also connected to the client devices 208, 210 via the Firewall/NAT devices 206a, 206b.

The system 200 requires an Allocation Protocol link to be established between the website application server 202 and the WebSBC server 204. This link should use a secure protocol API such as Representational State Transfer (REST) over HTTP/HTTPS, but other secure protocols can be used as well. The link can be initiated by either the website application server 202 or the WebSBC server 204 based on preconfigured addresses. The link is expected to stay up for the duration of service and can provide for multiple client allocations over the common interface.

Figure 3:
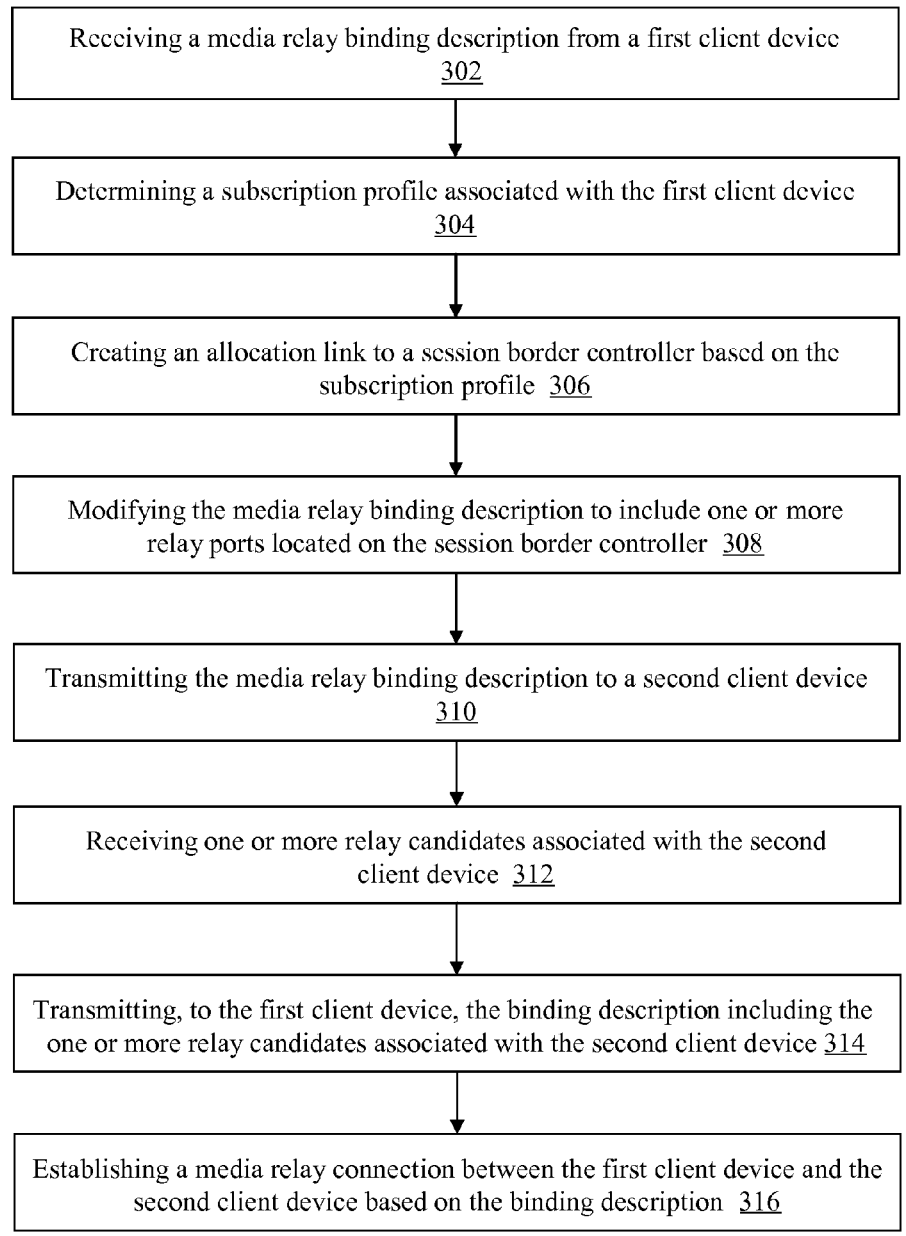
FIG. 3 is a flow diagram of a method for securely allocating media relay candidates without using Traversal Using Relays around NAT (TURN).
Figure 4:
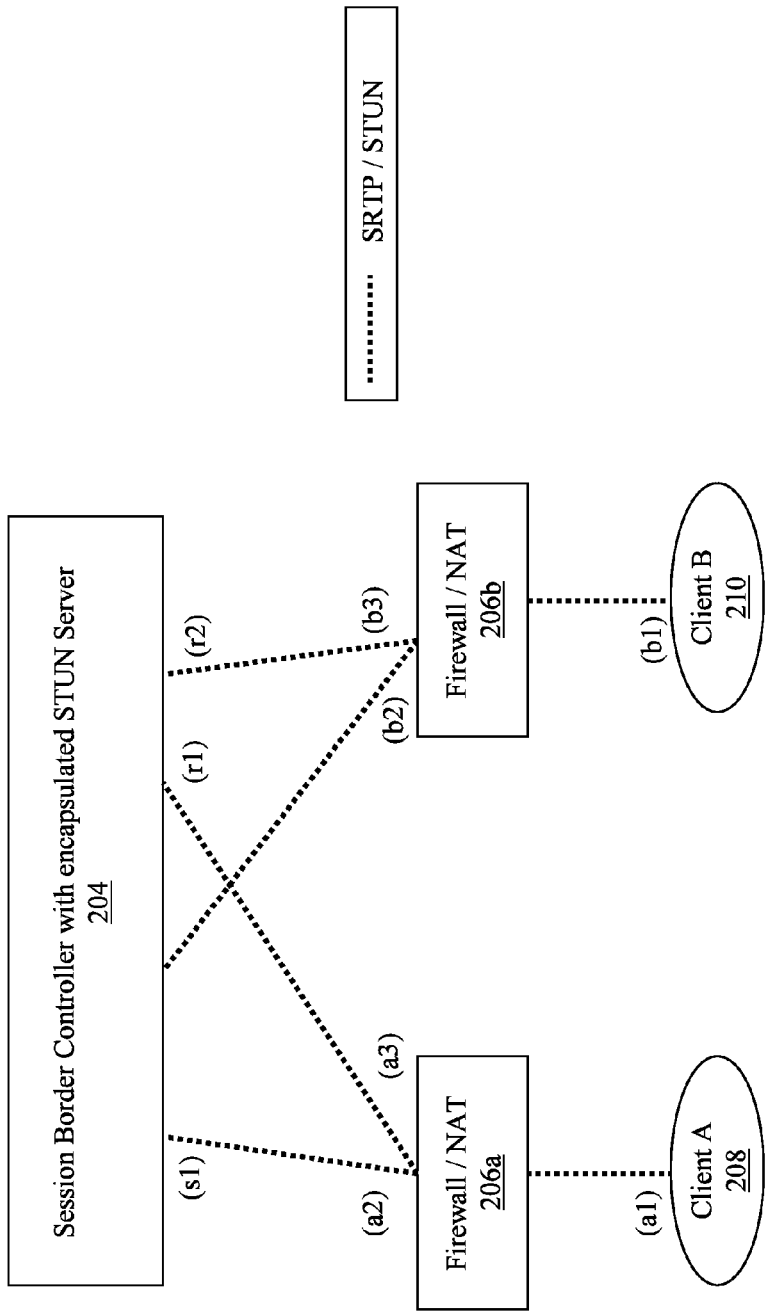
FIG. 4 is a block diagram of a system using a WebSBC server model showing the ICE relay candidates for Session Traversal Utilities for NAT (STUN) and WebSBC server, with Firewall/Network Address Translation (NAT) devices.

FIG. 3 is a flow diagram of a method 300 for securely allocating media relay candidates without using Traversal Using Relays around NAT (TURN) using the system 200 of FIG. 2, and FIG. 4 illustrates the Firewall/NAT and WebRTC/STUN candidates used in the system 200 of FIG. 2. When Client A 208 is told to initiate a media session (e.g., from the user at Client A clicking on a button/link on the website page), Client A 208 sends a STUN binding request to the STUN server (encapsulated in the WebSBC server 204) in order to determine its ICE relay candidates. In one embodiment, the STUN messages are transmitted over UDP (User Datagram Protocol), but the STUN messages can also be transmitted via RTP, DTLS-SRTP (Datagram Transport Layer Security-Secure Real-time Transport Protocol), or other similar protocols without departing from the scope of the invention. Also, as shown in FIG. 2, the STUN messages share the same network connection as SRTP.

The binding request sent by Client A 208 results in the Server Reflexive address (a2) being created. Client A 208 then constructs its media relay binding description (also called SDP) using the candidates (a1) and (a2) and passes the media relay binding description up to the website application server 202 via WebSockets or HTTP. The website application server 202 receives (302) the media relay binding description that includes the ICE relay candidates associated with Client A 208.

The website application server 202 then determines (304) a subscription profile associated with Client A 208. The website application server 202 decides, based on the subscription profile, to create (306) an allocation link (denoted by the Allocation Protocol link in FIG. 2) to a session border controller (e.g., the WebSBC server 204). The website application server 202 can send a REST command instructing the WebSBC server 204 to allocate a set of media relay ports. As shown in FIG. 4, a STUN server is encapsulated in the WebSBC server 204. By encapsulating the STUN server inside the WebSBC server 204, the STUN server can share the Denial of Service (DOS) protection and blocking capabilities as well as the redundancy schemes of the WebSBC server 204. The systems described herein are not limited to such an embodiment, however, as the STUN server and the WebSBC server can be deployed as separate nodes in the network without changing the behavior of the system 200.

The WebSBC server 204 then allocates two relay ports (r1) and (r2) and returns those candidates to the website application server 202 in an Allocation Protocol response. The website application server 202 then modifies (308) the media relay binding description by adding the relay candidate (r2) to Client A's (a1) and (a2) candidates, and transmits (310) the media relay binding description down to Client B 210. Client B responds by transmitting its two ICE relay candidates (b1) and (b2) to the website application server 202, and the website application server receives (312) the two ICE relay candidates from Client B 210. The website application server 202 then modifies the media relay binding description to add Relay candidate (r1) to the (b1) and (b2) candidates from Client B 210. The website application server 202 transmits (314) the media relay binding description, including the relay candidate (r1), to Client A 208. A media relay connection is established (316) between Client A 208 and Client B 210 based on the media relay binding description, via the relay ports (r1) and (r2) located on the WebSBC server 204.

The result of this network-based Relay candidate allocation is that Client A 208 is told to try to connect with Client B 210 using (b1), (b2), and (r1) candidates. Client B 210 subsequently tries to connect using (a1), (a2), and (r2) candidates. If the Host and Reflexive candidates are not able to communicate directly, then both clients 208, 210 begin sending STUN connectivity messages to the relay candidates (r1) and (r2). The act of sending those messages creates two new Firewall/NAT bindings (a3) and (b3).

The WebSBC server 204 in FIG. 4 then auto-learns the IP and port binding that occurred when the STUN connectivity messages were received over its (r1) and (r2) relay ports. The website application server 202 also shares the STUN short-term credentials, provided in the SDP, to the WebSBC server 204 within the Allocation Protocol so that the WebSBC server 204 can perform STUN authentication before latching the bindings (a3-r1) and (b3-r2).

For example, assume Client A 208 happens to attempt a connectivity check to the relay candidate (r1) before Client B 210 does its check to (r2). The WebSBC server 204 verifies that Client A 208 actually sent the connectivity message by performing the STUN short-term credential check using the information provided in Allocation Protocol request. If the authentication check passes, the WebSBC server 204 binds the (r1) relay port to the source IP and port (a3) of Client A's message. The WebSBC server 204 can either store that STUN message and deliver it to Client B 210 at a later time or the WebSBC server 204 can discard the message, relying on the fact that Client B's attempt should cause a retransmit from Client A 208. Once Client B 210 attempts a connectivity check to port (r2) and it is verified and latched, the WebSBC server 204 forwards it to the other latched connection on port (r1). From this point on, the two clients 208, 210 have a secure and authenticated path to complete the STUN connectivity handshake and can begin sending the media streams over the ports (a3-r1-r2-b3), as shown in FIG. 4. The WebSBC server 204 then has provided a network relay service without the same vulnerabilities as TURN. For example, in the WebSBC server model:

1) The client is never given reservation credentials so theft of the resource cannot occur.
2) The relay ports can be spread across many physical ports and are only accepting random STUN authentications during call setup. This greatly reduces the ability of an attacker being able to cause enough unnecessary processing within the WebSBC server in order to create a denial of service.

Figure 5:
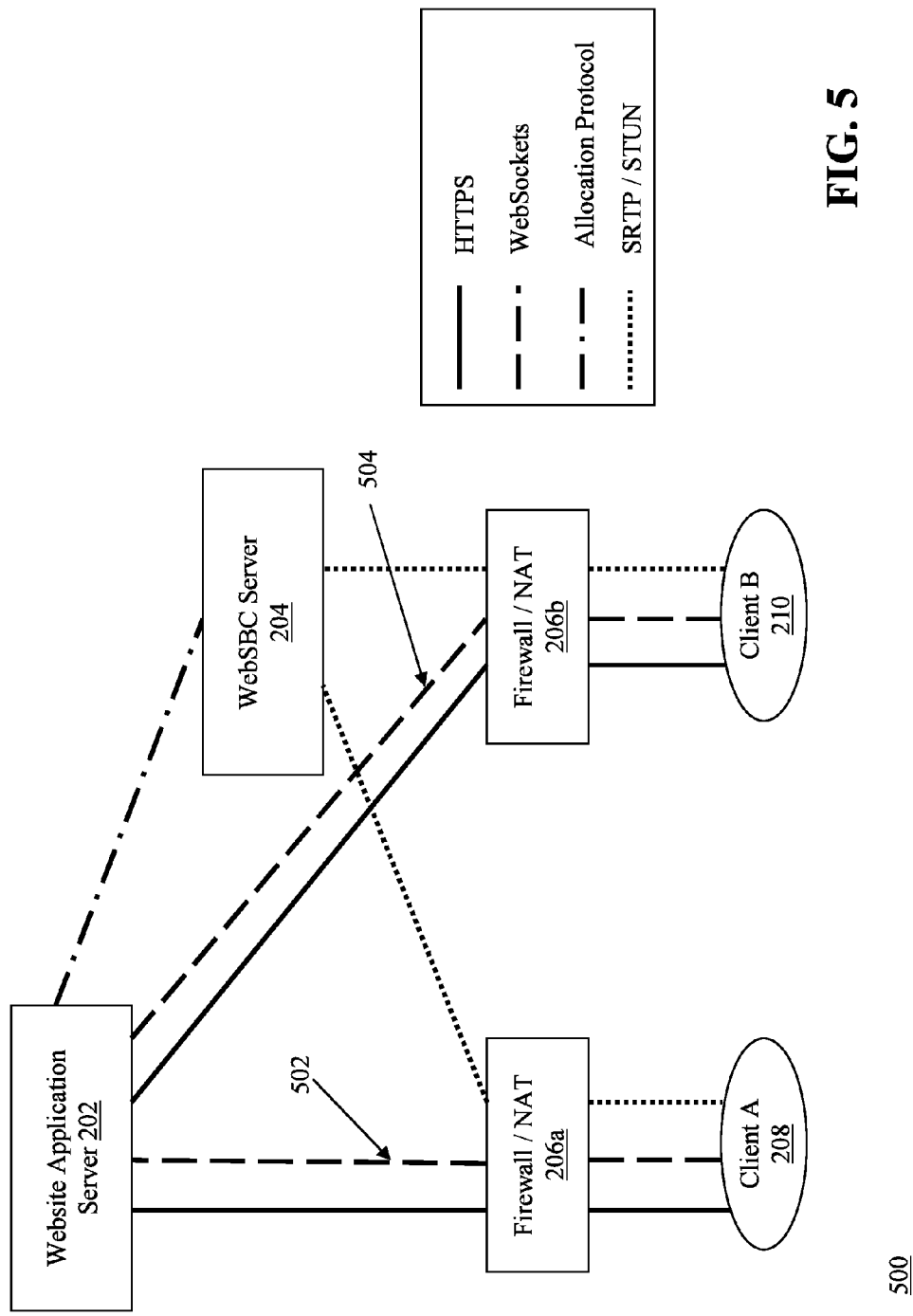
FIG. 5 is a block diagram of a system for securely allocating media relay candidates without using Traversal Using Relays around NAT (TURN), the system having WebSockets connections between client devices and the website application server.

In a second embodiment, the system 200 of FIG. 2 can utilize WebSockets connections between the client devices and the website application server for the purpose of call control. FIG. 5 is a block diagram of a system for securely allocating media relay candidates without using Traversal Using Relays around NAT (TURN), the system having WebSockets connections between client devices and the website application server. The system 500 includes the same components as the system 200 in FIG. 2, with the added feature of WebSockets connections (e.g., connection 502, connection 504) between the client devices 208, 210 and the website application server 202. The WebSockets connections 502, 504 enable full-duplex, low overhead, bidirectional communication between the website application server 202 and the respective clients 208, 210—providing a solution to reduce latency and unnecessary traffic that is scalable for large applications. As shown in FIG. 5, the system 500 uses the WebSockets connections for transmitting SIP call control messages, but it should be understood that any protocol can be transmitted using the WebSockets connections to implement a variety of applications—such as real-time messaging, games, social media, and the like.

Figure 6:
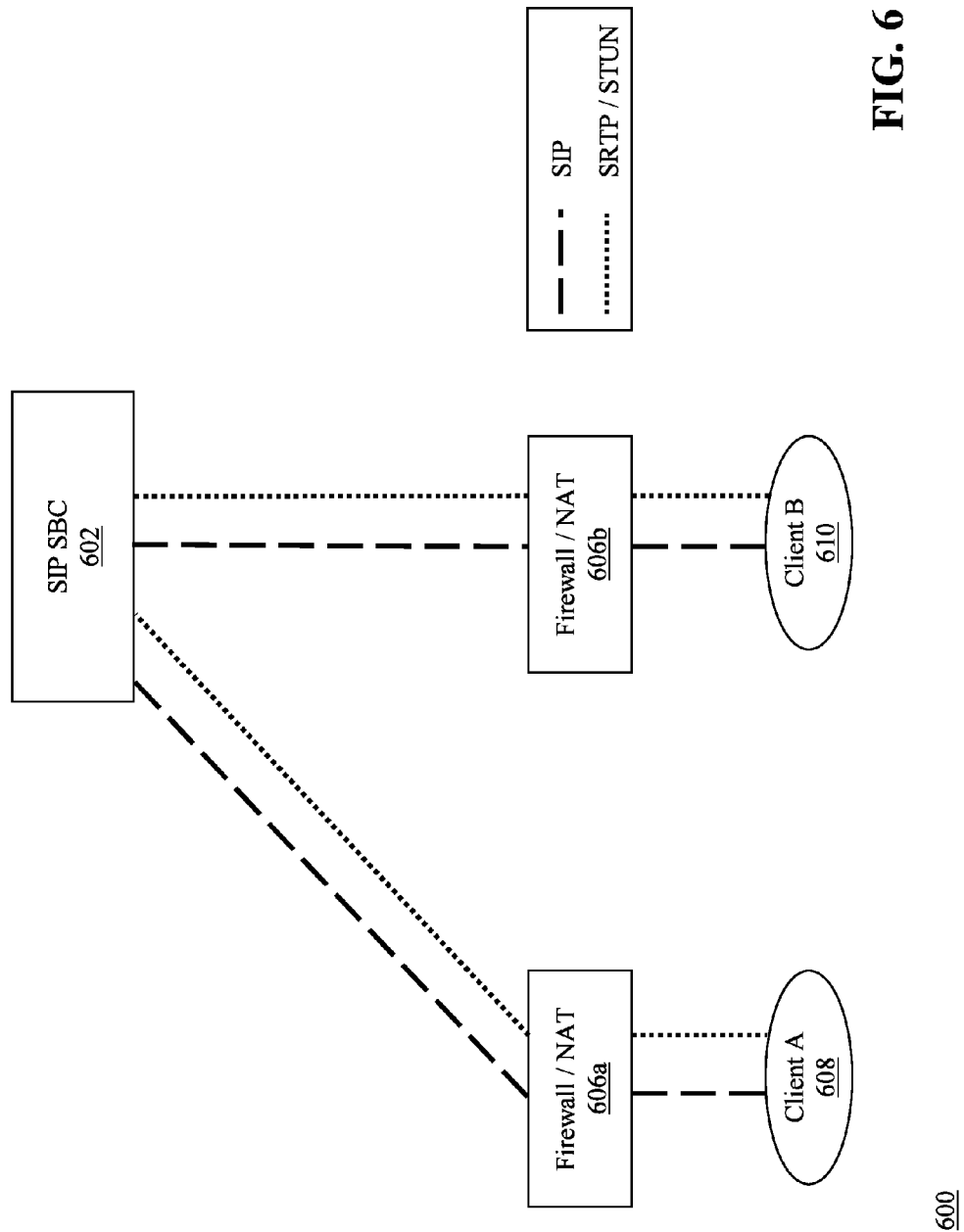
FIG. 6 is a block diagram of a system for securely allocating media relay candidates without using Traversal Using Relays around NAT (TURN), the system using a SIP session border controller model.

In a third embodiment, the ICE relay candidate creation techniques described above can be applied to a system using a SIP SBC model. FIG. 6 is a block diagram of a system 600 for securely allocating media relay candidates without using Traversal Using Relays around NAT (TURN), the system using a SIP SBC model. The system 600 includes a SIP SBC 602 that is connected via a communications network to client devices 608, 610 through Firewall/NAT devices 606a, 606b respectively.

The system 600 uses the same ICE relay candidate creation techniques as described above with respect to FIGS. 2-4. The SIP SBC 602 receives a media relay binding description from Client A 608 that includes the ICE relay candidates associated with Client A. The SIP SBC 602 allocates relay ports and modifies the media relay binding description to include the relay ports in addition to the ICE relay candidates from Client A 608. The SIP SBC 602 transmits the modified binding description to Client B 610, and Client B responds by sending its two ICE relay candidates back to the SIP SBC 602. The SIP SBC 602 then modifies the media relay binding description to add the (b1) and (b2) candidates from Client B 210. The SIP SBC 602 transmits the media relay binding description, including the relay ports, to Client A 608. A SIP connection is established between Client A 608 and Client B 610 based on the media relay binding description, via the relay ports located on the SIP SBC 602.

Allocation Protocol Attributes

The following section provides additional detail on the attributes of the allocation protocol used by the system 200 in FIG. 2 over the allocation link between the website application server 202 and the WebSBC server 204. The attributes include:

1) Secure protocol utilizing mechanisms such as REST over HTTP/HTTPS.
2) Ability to initiate and initialize a control session between the website application server and WebSBC server.
3) Ability for the website application server to query the status and capabilities of the WebSBC server.
4) Ability for the website application server to request a media relay allocation and other services such as IPv4 to IPv6 conversion and transcoding.
5) Ability for the WebSBC server to accept, reject, or redirect the resource allocation based on local conditions.
6) Ability for all media relay binding description (SDP) elements to be provided to and from the WebSBC server for the purpose of authentication and application features.
7) Ability for the website application server to request the WebSBC server to initiate an outbound SIP session using the SDP provided.
8) Ability for the website application server to request a media relay de-allocation.
9) Ability for the website application server to request and receive media stream events such as dual-tone multi-frequency (DTMF) signaling.

ICE Media Relay Binding Description Examples Using a WebSBC Server

The following are examples of the media relay binding description, also called the SDP, transmitted between the client devices 208, 210 and the website application server 202, as described above with respect to FIGS. 2-4.

(1) Client A's SDP as offered to the website application server after its STUN binding request:
v=0
o=Sansay-VSXi 188 1493 IN IP4 10.10.0.1
s=session controller
c=IN IP4 192.168.0.3
t=0 0
a=ice-pwd:wle838201wckgikdid
a=ice-ufrag:fred
m=audio 34902 RTP/AVP 0
b=RS:0
b=RR:0
a=rtpmap:0 PCMU/8000
a=candidate:1 1 UDP 73849293 10.10.0.1 21000 typ host
a=candidate:2 1 UDP 39203499 192.168.0.3 34902 typ srflx raddr 10.10.0.1 rport 21000

(2) Website application server modified SDP after WebSBC server relay allocation as sent to Client B:
v=0
o=Sansay-VSXi 188 1493 IN IP4 10.10.0.1
s=session controller
c=IN IP4 192.168.0.3
t=0 0
a=ice-pwd:wle838201wckgikdid
a=ice-ufrag:fred
m=audio 34902 RTP/AVP 0
b=RS:0
b=RR:0
a=rtpmap:0 PCMU/8000
a=candidate:1 1 UDP 73849293 10.10.0.1 21000 typ host
a=candidate:2 1 UDP 39203499 192.168.0.3 34902 typ srflx raddr 10.10.0.1 rport 21000
a=candidate:3 1 UDP 18320293 69.122.49.7 10034 typ relay raddr 192.168.0.3 rport 34902

(3) Client B's SDP as offered to the website application server after its STUN binding request:
v=0
o=Sansay-VSXi 4943 168 IN IP4 10.0.32.1
s=session controller
c=IN IP4 179.128.0.3
t=0 0
a=ice-pwd:olialske329sda
a=ice-ufrag:lou
m=audio 53120 RTP/AVP 0
b=RS:0
b=RR:0
a=rtpmap:0 PCMU/8000
a=candidate:1 1 UDP 55849293 10.0.32.1 39000 typ host
a=candidate:2 1 UDP 62203499 179.128.0.3 53120 typ srflx raddr 10.0.32.1 rport 39000

(4) Website application server modified SDP as sent to Client A:
v=0
o=Sansay-VSXi 4943 168 IN IP4 10.0.32.1
s=session controller
c=IN IP4 179.128.0.3
t=0 0
a=ice-pwd:olialske329sda
a=ice-ufrag:lou
m=audio 53120 RTP/AVP 0
b=RS:0
b=RR:0
a=rtpmap:0 PCMU/8000
a=candidate:1 1 UDP 55849293 10.0.32.1 39000 typ host
a=candidate:2 1 UDP 62203499 179.128.0.3 53120 typ srflx raddr 10.0.32.1 rport 39000
a=candidate:3 1 UDP 94320293 69.122.49.7 10032 typ relay raddr 179.128.0.3 rport 53120

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A method for securely allocating Internet Connectivity Establishment (ICE) relay candidates without using Traversal Using Relays around NAT (TURN), the method comprising:

receiving, by a website application server, an ICE relay binding description from a first ICE client device, the binding description including ICE relay candidates associated with the first ICE client device;

determining, by the website application server, a subscription profile associated with the first ICE client device;

creating, by the website application server, an allocation link to a session border controller based on the subscription profile;

modifying, by the website application server, the ICE relay binding description to include one or more relay ports located on the session border controller;

transmitting, by the website application server, the ICE relay binding description to a second ICE client device;

receiving, by the website application server, one or more ICE relay candidates associated with the second ICE client device;

transmitting, by the website application server to the first ICE client device, the ICE relay binding description including the one or more ICE relay candidates associated with the second ICE client device; and establishing an ICE relay connection based on the ICE relay binding description, wherein the ICE relay connection is established (i) directly between the first ICE client device and the second ICE client device via the ICE relay candidates associated with the first and second ICE client devices or (ii) indirectly via the relay ports located on the session border controller when the ICE relay connection cannot be established directly between the first ICE client device and second ICE client device.

2. The method of claim 1, wherein the ICE relay connection uses Session Initiation Protocol (SIP).

3. The method of claim 1, wherein the allocation link is created using a secure protocol.

4. The method of claim 3, wherein the secure protocol is Representational State Transfer (REST) over Hypertext Transfer Protocol Secure (HTTPS).

5. The method of claim 1, wherein the ICE relay connection uses the Web Real-Time Communication (WebRTC) protocol.

6. The method of claim 5, wherein the session border controller is a WebSBC server.

7. The method of claim 1, wherein the step of establishing an ICE relay connection comprises:

receiving, by the session border controller, a connectivity message from the first ICE client device via a first one of the relay ports located on the session border controller;

receiving, by the session border controller, a connectivity message from the second ICE client device via a second one of the relay ports located on the session border controller;

authenticating, by the session border controller, the connectivity messages using credential information received from the website application server via the allocation link;

latching, by the session border controller, address information associated with the first ICE client device to the first one of the relay ports;

latching, by the session border controller, address information associated with the second ICE client device to the second one of the relay ports;

forwarding, by the session border controller, the connectivity message from the first ICE client device to the second ICE client device; and forwarding, by the session border controller, the connectivity message from the second ICE client device to the first ICE client device.

8. The method of claim 7, wherein the connectivity messages are based on the Session Traversal Utilities for NAT (STUN) protocol.

9. The method of claim 7, wherein the connectivity message from the first ICE client device includes the address information associated with the first ICE client device and the connectivity message from the second ICE client device includes the address information associated with the second ICE client device.

10. The method of claim 7, wherein the address information associated with the first ICE client device represents a new IP address and port number generated by the first ICE client device upon transmitting the connectivity message to the session border controller.

11. The method of claim 7, wherein the address information associated with the second ICE client device represents a new IP address and port number generated by the second ICE client device upon transmitting the connectivity message to the session border controller.

12. The method of claim 1, wherein the ICE relay binding description is a Session Description Protocol (SDP) message.

13. The method of claim 1, wherein the ICE relay candidates associated with the first ICE client device include a server reflexive address associated with a Network Address Translation (NAT) device coupled between the first ICE client device and the website application server.

14. The method of claim 1, wherein the ICE relay candidates associated with the second ICE client device include a server reflexive address associated with a Network Address Translation (NAT) device coupled between the second ICE client device and the website application server.

15. A computer program product, tangibly embodied in a non-transitory computer readable medium, for securely allocating Internet Connectivity Establishment (ICE) relay candidates without using Traversal Using Relays around NAT (TURN), the computer program product including instructions operable to cause a data processing apparatus to:

receive an ICE relay binding description from a first ICE client device, the binding description including ICE relay candidates associated with the first ICE client device;

determine a subscription profile associated with the first ICE client device;

create an allocation link to a session border controller device based on the subscription profile;

modify the ICE relay binding description to include one or more relay ports located on the session border controller device;

transmit the ICE relay binding description to a second ICE client device;

receive one or more ICE relay candidates associated with the second ICE client device;

transmit, to the first client device, the ICE relay binding description including the one or more ICE relay candidates associated with the second ICE client device; and establish an ICE relay connection based on the ICE relay binding description, wherein the ICE relay connection is established (i) directly between the first ICE client device and the second ICE client device via the ICE relay candidates associated with the first and second ICE client devices or (ii) indirectly via the relay ports located on the session border controller device when the ICE relay connection cannot be established directly between the first ICE client device and second ICE client device.

16. A system for securely allocating Internet Connectivity Establishment (ICE) relay candidates without using Traversal Using Relays around NAT (TURN), the system comprising:

a website application server device comprising a CPU coupled to a memory and to one or more communication interface ports, the website application server device configured to:

receive an ICE relay binding description from a first ICE client device, the binding description including ICE relay candidates associated with the first ICE client device;

determine a subscription profile associated with the first ICE client device;

create an allocation link to a session border controller device based on the subscription profile;

modify the ICE relay binding description to include one or more relay ports located on the session border controller device;

transmit the ICE relay binding description to a second ICE client device;

receive one or more ICE relay candidates associated with the second ICE client device;

transmit, to the first ICE client device, the ICE relay binding description including the one or more ICE relay candidates associated with the second ICE client device; and establish an ICE relay connection based on the ICE relay binding description, wherein the ICE relay connection is established (i) directly between the first ICE client device and the second ICE client device via the ICE relay candidates associated with the first and second ICE client devices or (ii) indirectly via the relay ports located on the session border controller device when the ICE relay connection cannot be established directly between the first ICE client device and second ICE client device.

17. The system of claim 16, wherein the ICE relay candidates associated with the second ICE client device include a server reflexive address associated with a Network Address Translation (NAT) device coupled between the second ICE client device and the website application server device.

18. The system of claim 16, wherein the allocation link is created using a secure protocol.

19. The system of claim 18, wherein the secure protocol is Representational State Transfer (REST) over Hypertext Transfer Protocol Secure (HTTPS).

20. The system of claim 16, wherein the ICE relay connection uses the Web Real-Time Communication (WebRTC) protocol.

21. The system of claim 20, wherein the session border controller device is a WebSBC server computing device.

22. The system of claim 16, wherein the step of establishing an ICE relay connection comprises the session border controller device being configured to:

receive a connectivity message from the first ICE client device via a first one of the relay ports located on the session border controller device;

receive a connectivity message from the second ICE client device via a second one of the relay ports located on the session border controller device;

authenticate the connectivity messages using credential information received from the website application server device via the allocation link;

latch address information associated with the first ICE client device to the first one of the relay ports;

latch address information associated with the second ICE client device to the second one of the relay ports;

forward the connectivity message from the first ICE client device to the second ICE client device; and forward the connectivity message from the second ICE client device to the first ICE client device.

23. The system of claim 22, wherein the connectivity messages are based on the Session Traversal Utilities for NAT (STUN) protocol.

24. The system of claim 22, wherein the connectivity message from the first ICE client device includes the address information associated with the first ICE client device and the connectivity message from the second ICE client device includes the address information associated with the second ICE client device.

25. The system of claim 22, wherein the address information associated with the first ICE client device represents a new IP address and port number generated by the first ICE client device upon transmitting the connectivity message to the session border controller device.

26. The system of claim 22, wherein the address information associated with the second ICE client device represents a new IP address and port number generated by the second ICE client device upon transmitting the connectivity message to the session border controller device.

27. The system of claim 16, wherein the ICE relay binding description is a Session Description Protocol (SDP) message.

28. The system of claim 16, wherein the ICE relay candidates associated with the first ICE client device include a server reflexive address associated with a Network Address Translation (NAT) device coupled between the first ICE client device and the website application server device.

* * * * *